(12) United States Patent
Harris

(10) Patent No.: US 6,830,454 B1
(45) Date of Patent: Dec. 14, 2004

(54) PERSONAL COMMUNICATION TOOL AND METHOD OF USE

(76) Inventor: Neal Harris, 26402 Edgemond La., Barrington, IL (US) 60010

( * ) Notice: Subject to any disclaimer, the term of this patent is extended or adjusted under 35 U.S.C. 154(b) by 263 days.

(21) Appl. No.: 09/374,122

(22) Filed: Aug. 12, 1999

(51) Int. Cl.⁷ .............................. G09B 19/00; A63F 9/06
(52) U.S. Cl. ...................... 434/237; 434/236; 434/393; 273/153 R
(58) Field of Search ................. 434/236, 237, 434/238, 258, 261, 112, 113, 163, 164; 273/440, 441, 443, 444, 459, 153 R; 472/62

(56) References Cited

U.S. PATENT DOCUMENTS

| | | | |
|---|---|---|---|
| 3,314,171 A | * | 4/1967 | Bethune |
| 3,625,516 A | * | 12/1971 | Handweller ............. 273/153 R |
| 3,712,617 A | * | 1/1973 | Ohlschlager ............ 273/153 R |
| 3,774,319 A | * | 11/1973 | Sprowls |
| 4,674,749 A | * | 6/1987 | Shaffer et al. .......... 273/153 R |

* cited by examiner

Primary Examiner—Derris H. Banks
Assistant Examiner—Bena B. Miller
(74) Attorney, Agent, or Firm—Kajane McManus

(57) ABSTRACT

The personal communication tool and method of use provide for relaxation of a person using the tool and method allowing for a greater depth of interpersonal or intra-personal communication levels.

5 Claims, 1 Drawing Sheet

PERSONAL COMMUNICATION TOOL AND METHOD OF USE

BACKGROUND OF THE INVENTION

1. Field of the Invention

The present invention relates to a personal communication tool and method of use. More particularly, the tool and method are designed to assist in opening lines of communication between at least two people.

2. Prior Art

Heretofore lines of personal communication between at least two people have been established in various ways. The psychological literature is replete with examples of tools for use in this area, as well as being replete with examples of methodologies used in reaching such goal.

However, it is not believed a tool or method of using, same as described hereinbelow has been taught, let alone suggested.

SUMMARY OF THE INVENTION

According to the invention there is provided a personal communication tool for use by a plurality of persons, the tool comprising a plurality of sections, each section incorporating a fingerwalk labyrinth for use by one person.

Further according to the invention there is provided a method of using a personal communication tool comprising at least two sections, each section incorporating a fingerwalk labyrinth for use by one person, the method including the steps of:

each person gaining access to a labyrinth in one section;

placing a finger within a peripheral end of a groove defining a labyrinth; and fingerwalking the path at least toward a centerpoint of the labyrinth.

DESCRIPTION OF THE PREFERRED EMBODIMENT

Figure 1:
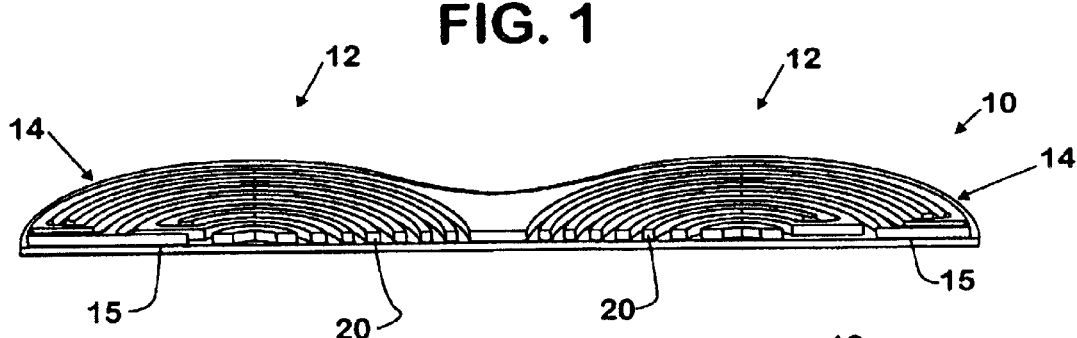
FIG. 1 is a cross sectional perspective view through an exemplary embodiment of a personal communication tool made in accordance with the teachings of the present invention.

Referring now to the drawings in greater detail, there is illustrated therein a personal communication tool made in accordance with the teachings of the present invention and generally identified by the reference numeral 10.

Figure 2:
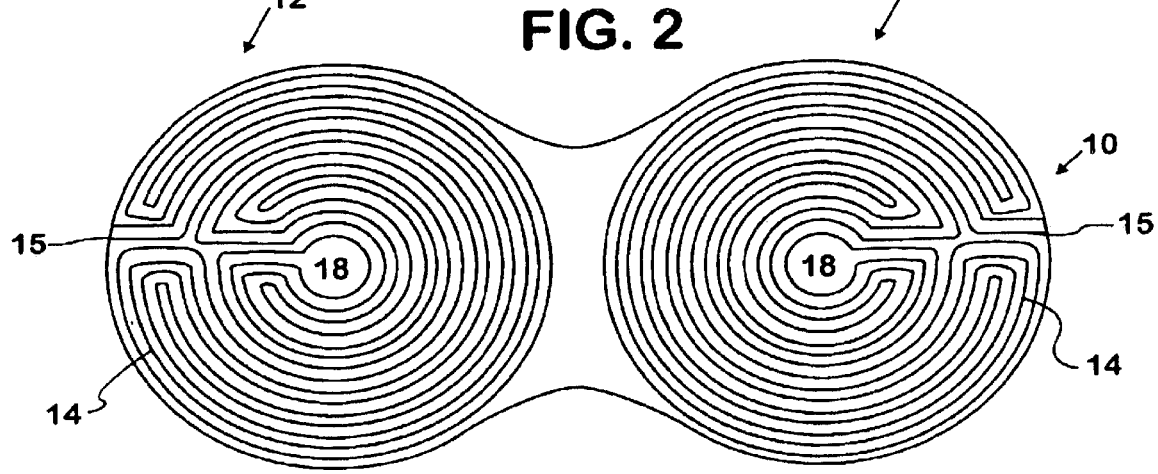
FIG. 2 is a top plan view of the tool in FIG. 1.
Figure 3:
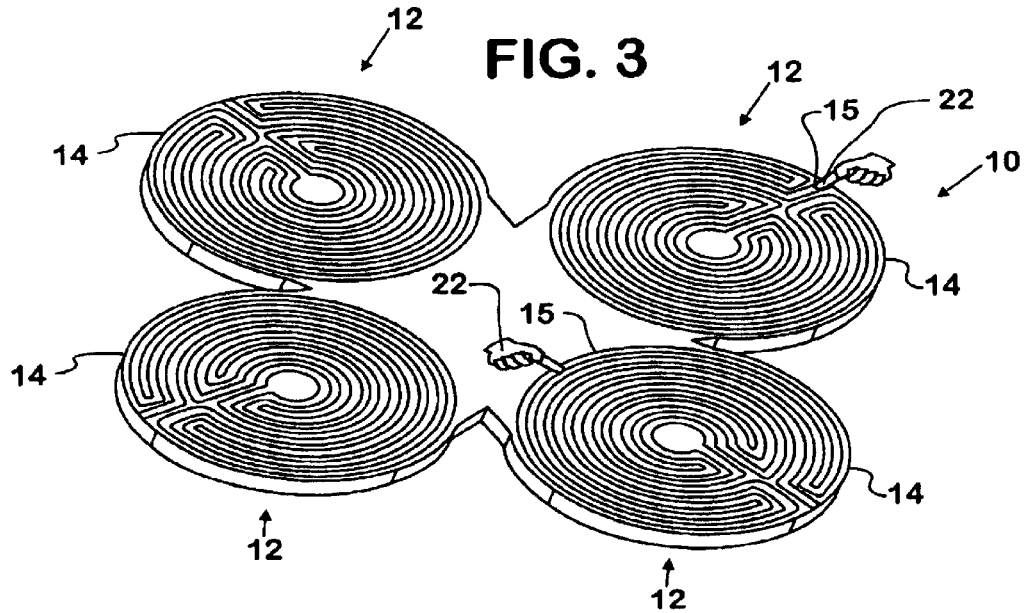
FIG. 3 is a perspective view of the tool for use by more than two people.

FIG. 1 is a perspective view through two adjacent sections 12 of either the two person tool 10 of FIG. 2 or the tool 10 of FIG. 3, illustrative of useability by more than two persons at a time. Therefore the number of sections 12 illustrated should not be construed as limiting.

Beginning with FIGS. 1 and 2, it will be understood that each section 12 of the tool 10 incorporates a labyrinth 14 with provides an elongate path 15 leading from a periphery 16 of the labyrinth 14 to a centerpoint 18 of the labyrinth 14. The path 15 is defined in the preferred embodiment as a continuous groove 15 winding toward the centerpoint 18, with adjacent areas of the winding groove 15 being separated from one another by an upstanding wall 20.

Thus, a person following the path 15 with a finger 22 wends his way along the groove 15 defined between the walls 20 toward the centerpoint 18 when the tool 10 is being used in the manner intended for personal communication.

The exemplary embodiment of a multiple person tool 10 illustrated in FIG. 3 is shown to comprise four sections 12, such that up to four persons may use the tool 10 in the manner to be defined hereinbelow.

The method of the use for the tool 10 is based on the premise that through quieting of the mind and slowing down of the body through relaxation, enhanced interpersonal (between two or more people) and intra-personal communication (communication that occurs within individuals to help them become more self-aware) occurs. As each person moves a finger 22 through a labyrinth 14, a process commonly referred to as "fingerwalking", the fingerwalk takes an individual from the periphery 24 to the centerpoint 18. Reaching the centerpoint 18 is not the object, rather it is the communication that occurs along the "journey" to and from the centerpoint 18 which is most valuable. Because the labyrinth path 15 contains no blind alleys or dead ends, the fingerwalk journey becomes one of introspection and self-awareness (intra-personal communication), and can easily foster greater interpersonal communication as well.

As an example, let us begin with the two-person tool 10 which can be used at any time in a therapy session to enhance the aforementioned forms of communication. A client and a therapist sit face to face across from one another with their knees close together so that half the tool 10 rests on the client's knees and half on the therapist's knees. They must be seated close enough to one another to allow for easy and total arms length access of their section 12 of the tool 10 without any strain.

With the two people seated together in this manner, the therapist briefly explains the process and purpose of using the tool 10 and which counseling issue is to be delved into for that session. He then suggests to the client that they both take several deep breaths to relax and afterward, begin the fingerwalk to the centerpoint 18 at whatever pace each person feels comfortable with. During the journey, the client is instructed to verbalize any thoughts that form or feelings that are experienced. The therapist may facilitate this dialogue by first asking the client open-ended questions (questions that help deepen the interaction because they require more than a "yes" or "no" answer) to help the client delve deeper into the particular issue for the session. The therapist may also allow the client to lead the session with the tool 10 by responding to the client when appropriate, but otherwise remaining quiet and relaxed.

It has been evidenced as the fingerwalk continues, due to the relaxation that occurs with both client and therapist, that the communication between them deepens and becomes more equal ("I'm ok, you're ok") rather than hierarchial ("I'm ok, your getting there").

Each person feels more comfortable and intuitively "tuned in" or "linked" to the other (mentally and emotionally) as a result of the relaxation created with the tool 10. This linking process often leads to more effective psychological issue resolution, resulting in a shorter-term therapy than one might achieve without tool 10 and its method of use.

The process of heightened communication among members of a group of three or more persons can also be realized with the use of a multi-section tool 10 (FIG. 3). Developing "group cohesion" (defined by how well members of a group understand one another and work together toward a common goal) is directly related to how relaxed each person in a group feels when communicating with other group members. The tool 10 and its method of use have been found to facilitate relaxation and introspection for each group member, thereby leading to more effective communication between them.

The above mentioned effect is inducible both within and outside of what is considered a traditional therapeutic group. Two examples of non-therapeutic groups that could use the tool 10 and method either prior to or during their meetings are, business board members; (to set the stage for increased cooperation through more effective communication), and project teams (needing to come up with more intuitive/creative ideas to further their joint venture). An example of a therapeutic group would be a Grief Support Group, run by a hospital or church.

As described above, the tool 10 and method of the present invention provide a number of advantages, some of which have been described above and others of which are inherent in the invention. Also, modifications may be proposed to the disclosure without departing from the teachings herein. Accordingly, the scope of the invention is only to be limited as necessitated by the accompanying claims.

I claim:

1. A personal communication tool for use by a plurality of persons, the tool comprising a plurality of sections, each section incorporating a fingerwalk labyrinth for use by one person in moving a finger through the labyrinth toward a center point thereof.

2. The tool of claim 1 wherein the plurality of persons is equal to the plurality of sections.

3. The tool of claim 1 wherein the plurality of persons is less than the plurality of sections.

4. A personal communication tool for use by at least two persons, the tool comprising at least two sections, each section incorporating a fingerwalk labyrinth for use by one person in moving a finger through the labyrinth toward a centerpoint thereof.

5. A method of using a personal communication tool comprising at least two sections, each section incorporating a fingerwalk labyrinth for use by one person, the method including the steps of:

the one person gaining access to a fingerwalk labyrinth in one section;

placing a finger within a peripheral end of a groove defining a labyrinth; and fingerwalking the path at least toward a centerpoint of the labyrinth.

* * * * *